United States Patent
Kohlmeier-Beckmann et al.

(10) Patent No.: US 8,325,023 B2
(45) Date of Patent: Dec. 4, 2012

(54) SYSTEM FOR AND METHOD OF SERVICING A PLURALITY OF SERVICE POSITIONS

(75) Inventors: Carsten Kohlmeier-Beckmann, Buxtehude (DE); Jens Kessler, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 618 days.

(21) Appl. No.: 12/503,742

(22) Filed: Jul. 15, 2009

(65) Prior Publication Data

US 2010/0012780 A1    Jan. 21, 2010

Related U.S. Application Data

(60) Provisional application No. 61/081,543, filed on Jul. 17, 2008.

(30) Foreign Application Priority Data

Jul. 17, 2008 (DE) .......................... 10 2008 033 733

(51) Int. Cl.
    *G07C 11/00* (2006.01)
(52) U.S. Cl. ................................. 340/286.06; 340/691.1
(58) Field of Classification Search ............ 340/286.06, 340/686.1, 691.1, 691.6, 3.1, 5.1
    See application file for complete search history.

(56) References Cited

U.S. PATENT DOCUMENTS

| | | | |
|---|---|---|---|
| 6,796,690 B2 | 9/2004 | Bohlander | 362/471 |
| 7,137,594 B2 * | 11/2006 | Mitchell et al. | 244/118.6 |
| 7,641,370 B2 * | 1/2010 | Heine et al. | 362/471 |
| 2001/0023499 A1 | 9/2001 | Wakahara | 725/143 |
| 2003/0174499 A1 | 9/2003 | Bohlander | 362/240 |
| 2007/0035955 A1 * | 2/2007 | Puschmann | 362/472 |
| 2007/0061847 A1 * | 3/2007 | Callahan et al. | 725/76 |

FOREIGN PATENT DOCUMENTS

| | | |
|---|---|---|
| DE | 198 43 330 | 3/2000 |
| DE | 699 14 617 | 11/2004 |
| DE | 10 2005 003 873 | 8/2006 |
| DE | 10 2009 009 188 | 8/2010 |
| GB | 2 437 162 | 10/2007 |

* cited by examiner

*Primary Examiner* — Toan N Pham

(74) *Attorney, Agent, or Firm* — Sunstein Kann Murhpy & Timbers LLP

(57) ABSTRACT

The present invention concerns a system for servicing a plurality of service positions which are assigned to a plurality of installation elements, in particular passenger seats in an aircraft, comprising: a plurality of service units, in particular lighting units, wherein the number of service units exceeds the number of service positions to be serviced, and a control unit, wherein the control unit is adapted to receive a respective item of control information including an identification in respect of an installation element and to control a predetermined service unit on the basis of the identification, and a method of servicing a plurality of service positions which are assigned to a plurality of installation elements, in particular passenger seats in an aircraft, and a corresponding computer program.

19 Claims, 5 Drawing Sheets

SYSTEM FOR AND METHOD OF SERVICING A PLURALITY OF SERVICE POSITIONS

PRIORITY

The present application claims priority from the U.S. Provisional Application 61/081,543, filed Jul. 17, 2008, and German Application DE 10 2008 033 733.1, also filed Jul. 17, 2008, both of which are hereby incorporated by reference in their entireties.

FIELD OF THE INVENTION

The present invention concerns a system for and a method of servicing a plurality of service positions, in particular for lighting a plurality of lighting positions.

BACKGROUND OF THE INVENTION

Particularly in the area of equipping cabins in passenger aircraft, endeavours are being made to permit reconfiguration for example of the seat arrangement, as quickly and easily as possible. It seems desirable to adapt the passenger aircraft to the aspects involved in different flight distances, by a variation for example in the respective seat spacings in the longitudinal direction of the cabin. In that respect it can be provided that the cabin is to be reconfigured in the time between landing as an arrival flight and take-off as a departure flight.

A problem in this respect however is in particular that a series of service units is assigned to a seat, such units including in particular reading lamps and display units for example for calling a flight attendant. Such service units are generally controlled by the passenger with operating elements which are integrated in the seat or fitted to the seat. The operating elements themselves are thus also reconfigured when reconfiguring passenger seats, in which respect however the service units have to be respectively adapted to the altered seat situation by reorganisation measures on the interior cabin panelling, which is a complicated and expensive operation. Even a modular structure which is geared to relatively easy displacement of the service units or components which include such service units still always necessitates intervention procedures on the interior cabin panelling before service units and seat positions are matched to each other.

In particular reading lights are associated at the present time with each individual seat, in which case however they are generally not integrated in the seat. Conventionally reading lights which are fitted in the cabin wall therefore have to be suitably positioned by displacement of the supply units (PSU) in the longitudinal direction of the cabin.

Added to that is the fact that in particular reading lights are individually adjusted by means of a suitable tool in such a way that the illuminated area is optimum for the respective seat in the currently set position of the seat in the cabin. That is a working step which can only be carried out late in the process of production of a cabin for a given seat configuration and is time-intensive.

A wide range of possible structures and modes of operation can be used as lighting means for for example the reading lights in an aircraft cabin.

DE 198 43 330 A1 discloses for example fitting light emitting diodes (LEDs) for interior lighting or reading lights in the interior of an aircraft cabin.

US No 2003/0174499 A1 proposes actuating in specifically targeted fashion a selection of LEDs out of an arrangement of a plurality of LEDs, each of which is associated with a respective seat, to permit a greater variability in the lighting area or the kind of lighting afforded.

GB 2 437 162 A describes a lighting arrangement which can be adapted for different arrangements of aircraft passenger seats, in mutually juxtaposed relationship.

The problem of adaptation complication and effort for service units which is linked to reconfiguration of installation elements to be serviced such as for example a change in the seat spacing in the longitudinal direction of the cabin has not hitherto been satisfactorily tackled in the state of the art.

SUMMARY OF THE INVENTION

With that background in mind the invention aims to provide a system for and a method of servicing a plurality of service positions, in particular for lighting a plurality of lighting positions, which allows substantially automatic adaptation to variable configurations of installation elements to be serviced. In particular the aim, when rearranging installation elements, is to be able to dispense with mechanical reconfiguration of the service units provided for servicing of the installation elements.

The present invention provides a system for servicing a plurality of service positions which are assigned to a plurality of installation elements, in particular passenger seats in an aircraft, comprising: a plurality of service units, in particular lighting units, wherein the number of service units exceeds the number of service positions to be serviced, and a control unit, wherein the control unit is adapted to receive a respective item of control information including an identification in respect of an installation element and to control a predetermined service unit on the basis of the identification.

In addition the present invention provides a method of servicing a plurality of service positions which are assigned to a plurality of installation elements, in particular passenger seats in an aircraft, in particular with a system according to the invention, comprising the steps: receiving an item of control information, taking an identification in respect of an installation element from the control information, and controlling a predetermined service unit, in particular a lighting unit, on the basis of the identification from a plurality of service units, wherein the number of service units exceeds the number of service positions to be serviced.

In addition there is proposed a computer program with computer program means which are adapted to cause a computer to carry out the steps of a method according to the invention when the computer program is executed on the computer.

The invention aims on the one hand to save on or at least reduce complicated and expensive adjustment and/or refitting for variable configurations of installation elements and on the other hand to automate the association of service units, for example reading lights, with the individual rows of seats (as an example of an arrangement of installation elements). In that respect, in regard to the lighting units, it is possible to reap the benefit of the fact that LEDs, as lighting means which are already used for reading lights, are in the meantime so inexpensive that a one-to-one relationship between seats and lights is no longer required. In other words, particularly regarding the aspect of lighting units in the form of reading lights, it has been recognised that there is no need to provide for each seat only one reading light which then however is also provided only for that one seat in the specific configuration of the cabin.

It was recognised that automatic adaptation of a service provision to changes in the installation of for example aircraft passenger seats is possible if there is provided a plurality of service units, the number of which exceeds the number of the positions to be serviced, so that it is possible to select from the plurality of service units, for the service involved, the appropriate service units for the positions to be serviced, in which case selection of a respectively used service unit is effected on the basis of an indication relating to the corresponding installation element.

In particular in that respect in the context of a passenger aircraft cabin having a plurality of discrete seat positioning options, it can be provided that the number of service units corresponds to the number of possible seat positions, so that for each actual arrangement of passenger seats, for each passenger seat, it is possible to select a respectively suitable service unit from the plurality of service units, in regard to the control system, while the service units corresponding to seat positions which are currently not in use can remain unused.

Considered from another point of view therefore in accordance with the invention, for servicing a plurality of installation elements, there is provided a plurality of service units, the number of which exceeds the number of installation elements and which are adapted to a plurality of possible arrangements of individual installation elements in such a way that, for each provided arrangement of the plurality of installation elements, there is provided a selection from the plurality of service units, with which the installation elements can be serviced.

Accordingly, taking the example of the reading lights in a passenger aircraft cabin, more than one light is provided for each seat, wherein the appropriate light is alternatively selected in dependence on the seat position in use. Even if it is advantageous to provide a suitable light for each individual possible seat position, that is not absolutely necessary. Thus for example it may be sufficient to provide a respective dedicated light for for example two or more adjacent seat positions. That can be appropriate for example when the adjacent seat positions are so close together (for example at a spacing of 1 inch) that two or three lighting positions can be jointly serviced by a reading light, the illumination area of which is just so great as to provide adequate and desired lighting without adjacent seats also being unnecessarily lit.

The invention is based on the realisation that, if there is provided a sufficient number of service units to cover the potential positions of the installation elements, there is no need to provide for each installation element a dedicated service unit whose position or configuration has to be adapted upon a change in position of the installation element, but it is sufficient to permit a change in the association with a different service unit which is already adapted to the new position.

The present invention can be used for adaptation to changes in position of installation elements in one or two dimensions. In that case a one-dimensional change in position corresponds for example to a variation in the seat spacing for seats arranged one behind the other, with the arrangement of the seats in side-by-side relationship remaining substantially the same (for example a 3+3 or a 3+4+3 arrangement in a row of seats). Then, for each group of seats which are arranged one behind the other, it is possible to provide a respective separate independent system according to the invention which then includes for example an arrangement in a row of lighting units. Alternatively the system according to the invention can be designed for an additional variation in the seat positions in side-by-side relationship, in which case then also a two-dimensional arrangement of lighting units is to be appropriately provided for the possible seat positions.

In an advantageous configuration of the invention the identification includes the indication of a position of the installation element, wherein the control unit is provided with a predetermined association between the position and at least one service unit. If the identification used for controlling or determining the service unit includes a positional indication or consists of that positional indication, it is possible in a simple fashion for a service unit associated with the position indicated by the identification to be specifically selected and actuated by the control unit.

In a further embodiment of the invention the identification includes the indication of an absolute or relative position of the installation element and the control unit is adapted to derive from the absolute or relative position an association with the at least one service unit. The positional indication contained in the identification or represented by the identification can represent an actual positional indication, either relatively or absolutely. An absolute positional indication can be afforded for example by a co-ordinate system and corresponding indications while a relative position can include an indication of for example a distance and a direction in relation to a reference point or two or more distance indications in relation to two or more reference points. With the indication of an actual position, that affords a great deal of freedom in implementation of the invention, in particular as in that way the service positions can be selected completely freely and independently of positional presettings.

In accordance with an advantageous development the system according to the invention includes an operating or servicing unit linked to the installation element, wherein the servicing unit is adapted to receive signals, in particular radio signals, for determining the absolute or relative position of the installation element and to communicate the control information including the identification on the basis of the determined position to the control unit. In accordance with that development a servicing unit of the system according to the invention is connected to the installation element so that advantageously there is a predetermined relative positional relationship between the servicing unit and the installation element. By way thereof, by signals being sent from the servicing unit, it is thus possible to detect the relative or absolute position of the installation element, whereby ultimately it is possible to obtain the items of positional information which are provided for the control information or the identification and which can then be used for controlling a predetermined service unit. With the above-indicated possibility of determining position by a servicing unit, that affords a great deal of flexibility so that the system can be adapted by way of the servicing unit to practically all arrangements of the installation element.

In a further embodiment of the invention the system is adapted to determine the absolute or relative position by a transit time comparison of the received signals. An advantageous possible way of determining a relative or absolute position of the servicing unit and therewith the corresponding installation element involves the comparison of the reception times of signals, the emission of which is in a fixed time relationship relative to each other, which therefore for example are emitted at the same time or with a predetermined time displacement. A particular advantage of transmitting signals and of the transit time comparison is that it is possible to implement a contactless position-determining operation in which few additional items of information or settings have to be effected.

In accordance with an advantageous configuration the identification includes the indication of an identifier of a position out of a plurality of possible positions of an installation element, wherein at least one service unit is assigned to each identifier. Alternatively or supplemental to an actual positional indication which itself stands for a position, the identification can also include the positional indication in the form of a coding or identifier, for example a position number, which uniquely identifies the respective position out of the array of all possible positions. Thus the identifier of a position does not readily specify the actual position itself, but can only be used for determining an actual position, for example by using a suitable table. For the purposes of the present invention however it is not absolutely necessary to know the actual positional indication, for example in the form of co-ordinates in a co-ordinate system fixed with respect to an aircraft cabin, as the position identifier which uniquely specifies the respective position can be used for assigning a service unit in the context of the control for servicing the installation element. Particularly in situations in which only a given number of possible positions for installation elements are available, it is advantageous, instead of an actual positional indication, to communicate an identifier, whereby the amount of data to be communicated can be reduced.

In accordance with an advantageous development the system according to the invention includes an operating or servicing unit linked to the installation element, wherein the servicing unit is adapted to read an identifier of the position of the installation element out of the environment of the installation element. In that development the system advantageously includes a servicing unit which in turn is arranged in a known relative position with respect to the installation element. In addition precautions are to be taken here, which make it possible for the servicing unit to read the identifier of the position out of the environment of the installation element (which is also the environment of the servicing unit). It is easily possible in that way to ensure that, without additional steps being required, the respective servicing unit is in a position to determine the identifier in accordance with the current position of the installation element.

In an advantageous configuration of the invention the servicing unit is adapted to read out the identifier optically and/or by radio transmission, in particular by reading out a bar code and/or an RFID tag. It was found that reading out the identifier of the position of the installation element from the environment of the installation element is advantageously possible optically and/or by radio transmission. In that respect it is advantageously possible to use a bar code which for example is arranged on the floor of a cabin in such a way that the appropriate identifier can be read out by a suitable sensor in the seat as an example of the installation element. Alternatively or supplemental to such an optical reading-out operation, it is also possible for example to use an RFID communication for transmission of the identifier from a position mark (in particular in the form of an RFID tag) to the servicing unit.

In accordance with a further configuration of the invention the plurality of service units includes a plurality of lighting units, the servicing unit being adapted to read out the identifier by recording optical signals emitted by the plurality of lighting units. When using a plurality of lighting units in the context of the service units, the servicing unit can be informed about the respectively appropriate identifier by the communication of suitable optical signals, wherein that advantageously provides for double utilisation of the lighting units for lighting and in the context of ascertaining positions.

In a further advantageous configuration the system according to the invention includes a signal unit adapted to cause the plurality of service units to respectively output a signal which encodes at least one identifier which is associated with the respective service unit. Advantageously, the identifier can be transmitted, possibly once again in encoded form, directly with the output of a signal by the service units. By way of example the system according to the invention in this configuration can be so designed that each lighting unit as a constituent part of the plurality of service units outputs a light signal which for example by modulation of the light signal encodes a corresponding identifier which can then be received by the servicing unit.

In a further advantageous embodiment of the invention the identification includes the indication of a unique designation of a servicing unit linked to the installation element, wherein the control unit is equipped with a predetermined association between the designation and at least one service unit. Alternatively or supplemental to the positional indication the identification can also include a designation of a servicing unit assigned to the installation element, in which case then control of the at least one service unit is effected on the basis of that unique designation.

In accordance with a further advantageous embodiment of the invention the system includes a plurality of presence sensors, in particular microswitches and/or light barrier units, which are respectively adapted to determine a presence of an installation element at an associated position, and a plurality of servicing units with a respective unique designation, wherein each installation element out of the plurality of installation elements is linked to at least one servicing unit, wherein the plurality of the associated presence sensors has a predetermined first sequence, and wherein the plurality of servicing units has a predetermined second sequence, wherein the predetermined association between the designation and at least one service unit is afforded in accordance with the sequence of the positions with an installation element present. With this advantageous embodiment, the positions out of all the possible positions for installation elements, which are actually occupied with an installation element, are determined by suitable sensors which can be for example in the form of microswitches and/or light barrier units. The service positions to be serviced are to be determined in that way. The association used for control purposes between the servicing units and the respective positions of the installation elements can advantageously be achieved by a predetermined sequence of the link between servicing unit and installation element. If for example out of the possible positions 1 through 9 positions 2, 5 and 8 are occupied and if the sequence of the servicing units is A, B, C, that means that the servicing unit A is at position 2, servicing unit B is at position 5 and servicing unit C is at position 8. In that case the knowledge or presetting of a given sequence of servicing units is used together with the information relating to occupied positions in order in that way to provide for positional determination which can be implemented with very slight technical means.

In an advantageous configuration the system according to the invention includes a locating unit for locating the installation element by way of the servicing unit, wherein the servicing unit is adapted to emit a locating signal, and wherein the locating unit is adapted to receive the locating signal and to locate by means of the locating signal. Upon emission of a locating signal by a respective servicing unit the servicing unit and therewith the installation element linked to that servicing unit can be located by evaluation of the items of information connected to reception of the signal. In this configuration signal emission, on the basis of which positional determination takes place, comes from the servicing unit, processing of the emitted locating signal being effected outside the servicing unit. As in the framework for example of the control unit there are generally not such structural and technical limitations as occur in a small and compact servicing unit, it is thus possible overall to use more complicated and expensive and thus more accurate technical means for locating purposes, which otherwise, insofar as they were to be implemented in the servicing unit, could be implemented only with difficulty.

In an advantageous configuration of the invention the locating signal includes a non-directional signal, wherein the locating unit is adapted for locating by means of determining transit time, transit time difference and/or direction finding of the non-directional signal. If the servicing unit emits a non-directional signal the items of information necessary for determining the position or locating the servicing unit can be taken from the reception properties including transit time, transit time difference and/or direction finding of the non-directional signal. The emission of a non-directional signal is generally to be achieved with less expensive technical means so that the servicing unit can be of a simple structure.

In a further advantageous configuration of the invention the locating signal includes a directional signal, wherein the locating unit is equipped with a plurality of signal sensors and is adapted for location on the basis of an indication by signal sensors receiving the directional signal. Alternatively or in addition, the locating signal can also be emitted in directional form by the servicing unit, in which case suitable signal sensors are provided, which receive the directional signal. In that way the servicing unit and therewith the installation element can be located from the information about the orientation properties of the locating signal, which are predetermined in the system, and the information in respect of the signal sensor or sensors which receive the signal. If, with a directional signal, the information from the known orientation is additionally used for locating purposes, it is thus possible in that way to achieve a very accurate location.

In a further embodiment of the present invention the servicing unit is adapted to emit the directional signal with an optical projection of a predetermined geometrical form in such a way that a part of the plurality of signal sensors can receive a portion of the directional signal. In this embodiment the directional signal is provided in the form of an optical signal whose form is predetermined, wherein the locating information can then be obtained from the information in respect of the signal sensors addressed by that signal. For example the predetermined projection can be effected in the form of an X or a cross by laser, in which case then a respective selection of the optical signal sensors would be irradiated by that laser signal, which can be easily used for determining the position of the laser source and therewith the servicing unit.

In accordance with a further configuration of the invention the system includes an enquiry unit adapted to emit a plurality of enquiry signals which are respectively associated with a predetermined position region and to receive an answer signal from the servicing unit, wherein the servicing unit is adapted to receive an enquiry signal from the plurality of enquiry signals and to emit an answer signal in answer to the reception of the enquiry signal, wherein the answer signal includes the designation of the servicing unit, wherein the association between the designation and the at least one service unit is determined on the basis of the answer signal. In this advantageous embodiment the signals used for locating purposes are sent to the servicing unit or units, in which case the information necessary for locating can be obtained from the answer.

In accordance with an advantageous configuration of the invention the enquiry unit is adapted to respectively emit the plurality of enquiry signals in a time relationship with the corresponding position region, wherein the servicing unit is adapted to emit the answer signal in a predetermined time correlation with the reception of the enquiry signal, wherein the association between the designation and the at least one service unit is determined on the basis of the reception time of the answer signal by the enquiry unit. The information used for locating purposes can for example involve a time sequence in relation to a delivery of enquiry signals, wherein conclusions about the position of the answering servicing unit can be drawn from that time information.

In a further advantageous configuration of the invention the enquiry unit is adapted to respectively emit the plurality of enquiry signals inclusive of an indication of the corresponding position region, wherein the servicing unit is adapted to emit the answer signal inclusive of the indication of the position region, wherein the association between the designation and the at least one service unit is determined on the basis of the combination of indication and designation in the answer signal. Alternatively or supplemental to the foregoing configuration it can be provided that the enquiry signals are emitted in a spatially limited region, wherein it is possible to infer from the corresponding response that the servicing unit answering the enquiry signal is in the corresponding region.

In accordance with an embodiment of the invention the control unit is adapted to control a predetermined group of service units on the basis of the identification. The present invention is not restricted to only one individual service unit being assigned to a respective service position. It is possible for a plurality of service units also to be jointly assigned to a service position.

In accordance with an embodiment of the invention the number of service units or the number of predetermined groups of service units corresponds to the number of possible positions at which the installation elements can be arranged. In this embodiment, a service unit or a group of service units is provided for each possible position of an installation element and thus for each possible service position so that the service units can advantageously be specifically directed on to the respective position without an alternative position also having to be serviced. That permits advantageous delimitation in relation to adjacent positions whereby for example in the case of lighting units as the service units, it is possible to achieve better restriction to the intended lighting position. That makes it possible to better reduce disturbances to neighbors due to unwanted light.

In accordance with an advantageous configuration of the invention the control unit is adapted on the basis of the identification, instead of the predetermined service unit or the predetermined group of service units, to control an adjacent service unit or group of service units. With the predetermined relationship between the identification in respect of the installation element and the corresponding service unit which is to be controlled for that purpose, that gives a standard default which can be predetermined for the system. It can however occur in operation that an individual user wants a service differing therefrom. In the example of a plurality of lighting units as the service units, the user, in the case of the present configuration, can intend using an adjacent lighting unit or an adjacent group of lighting units, the illumination region of which is displaced by a given amount for example with respect to the standard setting. The present invention accordingly makes it possible to be better adapted to user service wishes without re-adjustment of the associated servicing units being necessary.

In a preferred configuration of the invention the servicing unit is integrated in a passenger seat for an aircraft as the installation element. The present invention can advantageously be used in particular in the context of a reconfiguration of the passenger seat arrangement in an aircraft cabin, in particular when the servicing unit is arranged in or on the passenger seat.

In accordance with an advantageous configuration of the invention the operating or servicing unit is autonomous in terms of power. With a power-autonomous servicing unit there is no need to provide an external power supply so that overall it is possible to afford a structure which is less complicated and expensive as for example it is possible to dispense with corresponding power supply cabling.

In an advantageous configuration of the invention the servicing unit is adapted to acquire the power necessary for emission of an item of control information from a service action by a user, in particular by way of a piezoelectric unit which is adapted to obtain power from a button press by the user. Upon operation of the servicing unit by a user the user typically applies a force to the servicing unit, wherein linked to that application of a force is an energy input which can be used for energy generation in particular using the piezoelectric principle.

BRIEF DESCRIPTION OF THE DRAWINGS

Preferred embodiments by way of example of the present invention are described in greater detail hereinafter with reference to the accompanying Figures. In that respect mutually corresponding components of various embodiments are denoted by the same or corresponding references, for reasons of easier comparability.

DETAILED DESCRIPTION OF SPECIFIC EMBODIMENTS

Figure 1:
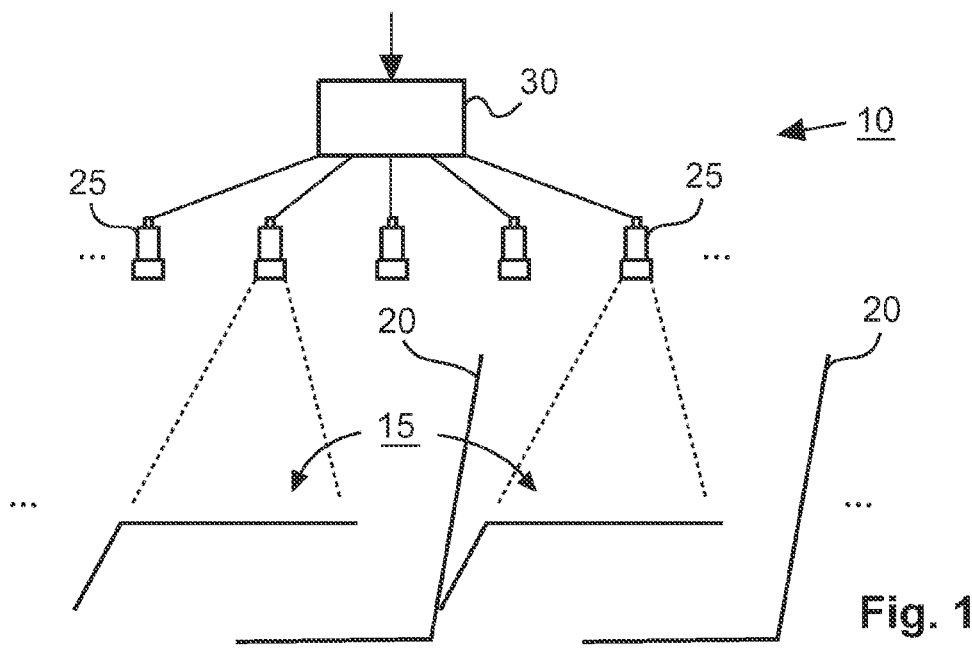
FIG. 1 illustrates a first embodiment of the system according to the invention.

List of References
10 service system
15 service position
20 installation element/passenger seat
25 service unit/lighting unit
30 control unit
35 frame for single rail with service units
40 single rail with service units
45 frame for double rail with service units
50 double rail with service units
55 spacing between adjacent service units
60 width of a single rail
65 width of a double rail
70 length of a rail
75; 75' spacing between adjacent installation elements/seats
80 spacing between neighboring possible positions for installation elements/seats
85 servicing unit
90 radio transmission from servicing unit to control unit
95, 95' free space between adjacent installation elements/seats
100 projection
105 presence sensor/light barrier unit
110 reading-out unit
115 connection between reading-out unit and servicing unit
120 position mark/bar code
125, 125' locating unit
130, 130' locating signal
135 enquiry unit
140 enquiry signal
145 answer signal
150 step of receiving control information
155 step of taking identification
160 step of controlling the service unit FIG. 1 illustrates a first embodiment of the system according to the invention.

The system 10 illustrated in FIG. 1 in accordance with a first embodiment by way of example of the present invention includes a plurality of lighting units 25 as examples of service units which are coupled to a control unit 30. FIG. 1 also diagrammatically shows passenger seats 20 as examples of installation elements each provided with a respective table on which a service position 15 in the form of a region to be illuminated is defined.

The control unit receives control information (represented by the arrow above the control unit 30) and, on the basis of an identification included in the control information, controls selected lighting units 25, as is illustrated by the light cone diagrammatically shown in FIG. 1.

Figure 2A:
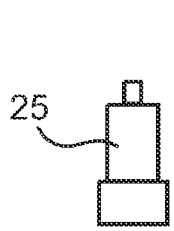
FIGS. 2a, 2b and 2c illustrate a lighting unit, a single rail with lighting units and a double rail with lighting units for use in a lighting system according to the present invention.
Figure 2B:
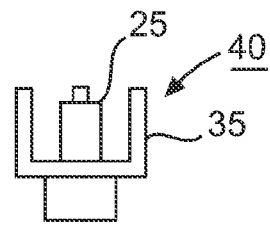
Figure 2C:
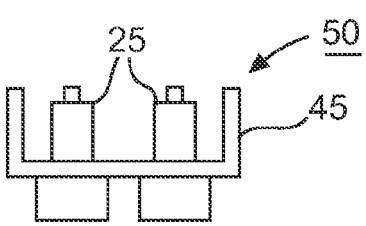

FIGS. 2a, 2b and 2c illustrate a lighting unit, a single rail with lighting units and a double rail with lighting units for use in a lighting system according to the present invention.

An example of the lighting units 25 shown in FIG. 1 is illustrated in FIG. 2a as a lighting unit 25. The lighting unit itself can be embodied in different ways, in which respect in particular an implementation by means of light emitting diodes (LEDs) is of particular advantage as typically the light emitting diodes which occupy a small amount of space can be used so that it is possible to achieve a comparatively high density of lighting units per unit of space. That affords the possibility of affording a large number of lighting units within the framework of the system according to the invention.

FIG. 2b shows a single rail 40 with a frame 35 and lighting units 25, only one lighting unit 25 being shown in the present cross-sectional view in FIG. 2b. With the combination of a plurality of lighting units 25 in a frame 35, a part of or the entire plurality of lighting units 25 is combined to afford a rail element 40 which can be easily handled. Supplemental or alternatively to the single rail 40 shown in FIG. 2b, it is also possible to provide a double rail 50, as is shown in FIG. 2*c*. In this case a plurality of lighting units 25 are fitted in a frame 45 so that the double rail 50 makes it possible to provide lighting units 25 for adjacent groups of installation elements.

Figure 3:
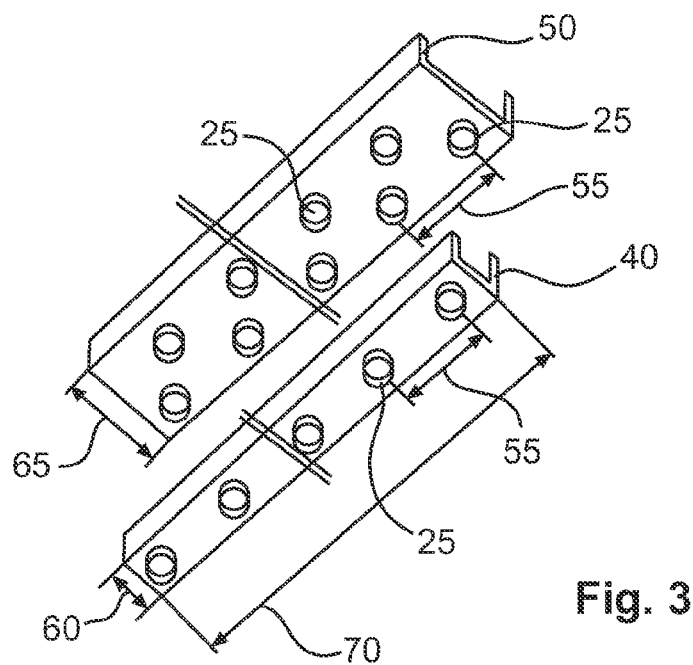
FIG. 3 illustrates a double rail and a single rail corresponding to FIGS. 2b and 2c.

FIG. 3 illustrates a double rail and a single rail corresponding to FIG. 2*b* and FIG. 2*c*.

The double rail 50 shown in FIG. 3 includes a plurality of lighting units 25 arranged in two rows which are provided displaced relative to each other by half the spacing 55 between two lighting units 25 in a row. In that way it is possible for the double rail 50 to be of a width 65 which is less than that which is afforded if the lighting units 25 are arranged in directly mutually juxtaposed relationship, as with the FIG. 3 arrangement, it is possible to achieve an overall larger spacing between adjacent lighting elements 25 of the various rows. Other arrangements however are also possible.

In addition FIG. 3 also shows a single rail 40 of a width 60 and a length 70 which, as indicated by the view in FIG. 3, can be markedly greater than the illustrated spacings between the five illustrated lighting units 25 of the single rail 40. A corresponding consideration equally applies for the double rail 50.

Basically there is no limitation on the length of the respective rails, apart from the question of handleability, for example in a fitting operation.

Figure 4:
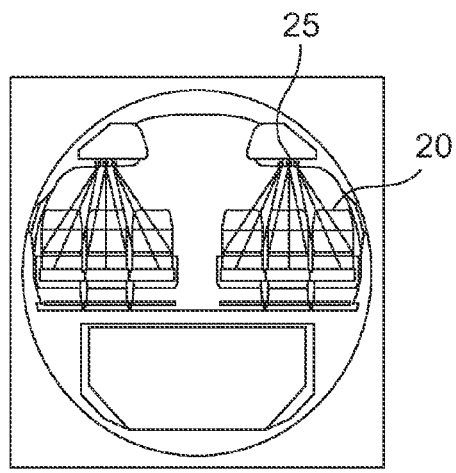
FIG. 4 illustrates a cross-section through a passenger aircraft cabin with a first structure illustrating lighting units and the corresponding lighting positions.

FIG. 4 illustrates a cross-section through a passenger aircraft cabin with a first structure with a view of lighting units and the corresponding lighting positions.

The illustrated aircraft cabin includes in the present case six passenger seats 20 as examples of installation elements arranged in mutually juxtaposed relationship in a row. The respective lighting units 25 are arranged above those groups of passenger seats 20 so that a respective lighting unit can provide illumination for the corresponding region appropriately for a respective passenger seat 20. FIG. 4 diagrammatically shows that the present system for servicing a plurality of service positions can also be used in conjunction with a conventional aircraft cabin design.

Figure 5:
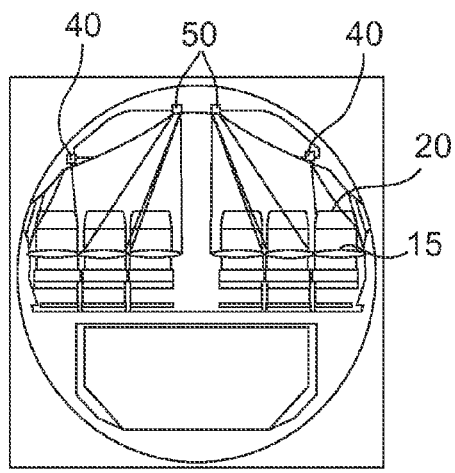
FIG. 5 illustrates a cross-section through a passenger aircraft cabin with a second structure also showing lighting units and the corresponding lighting positions.

FIG. 5 illustrates a cross-section through a passenger aircraft cabin with a second structure, also illustrating lighting units and the corresponding lighting positions.

The FIG. 5 design of the structure of an aircraft cabin differs from that shown in FIG. 4. Once again six passenger seats 20 are arranged in a row in mutually juxtaposed relationship in FIG. 5, wherein two single rails 40 and two double rails 50 are provided in the ceiling region of the cabin area, the rails being respectively designed to illuminate the service positions in the region of the respective passenger seats 20. It is possible with the system according to the invention to provide separate groups (here single rail and double rail) of service units without generating an increased level of reconfiguration complication and expenditure. In the case of conventional systems, when two lighting groups are provided separately, both lighting groups would also have to be adapted separately to a modified configuration. The system according to the invention makes such conversion operations on the service units very substantially unnecessary so that this gives a greater level of freedom in respect of design and equipment for the cabin region.

Figure 6A:
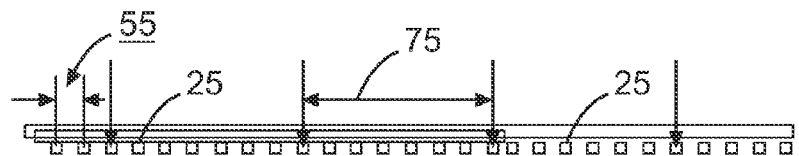
FIGS. 6a and 6b illustrate views in cross-section of first and second cabin configurations involving different positions or spacings of the passenger seats in a passenger aircraft cabin.
Figure 6A:
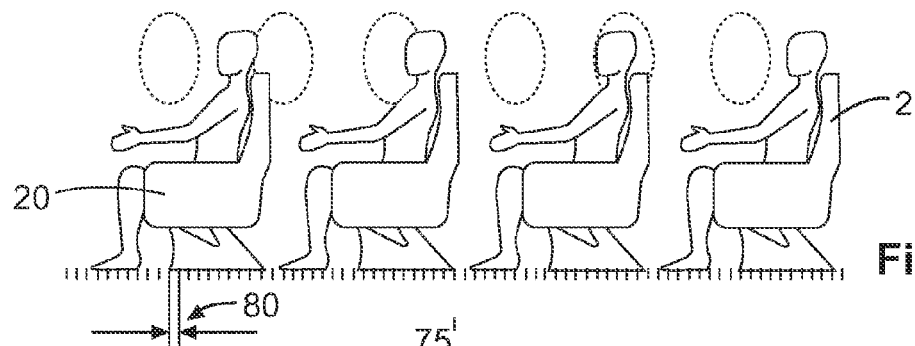
Figure 6B:
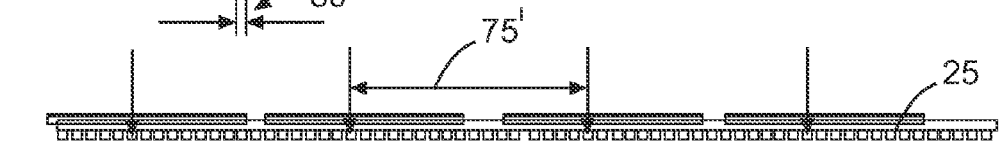
Figure 6B:
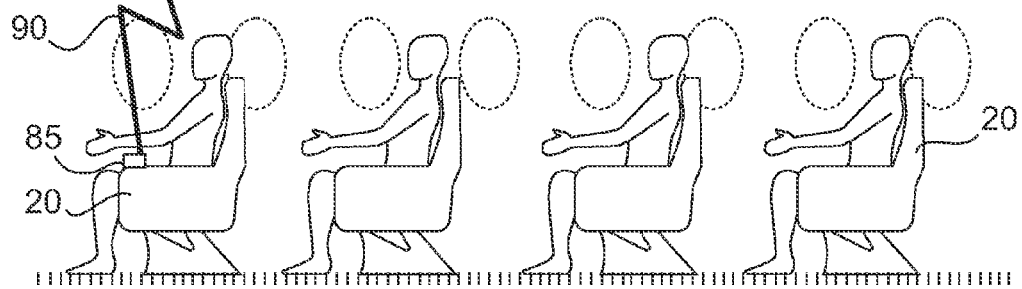

FIGS. 6*a* and 6*b* show views in cross-section of a first and a second cabin configuration involving different positions or spacings of the passenger seats in a passenger aircraft cabin.

With the FIG. 6*a* configuration there is the possibility of the respective passenger seats 20 being moved in their respective position by a minimum amount 80. With the FIG. 6*a* configuration the seats 20 are arranged at a spacing 75. The plurality of lighting units of the system according to the invention is mounted in the ceiling region of the aircraft cabin, while between two adjacent lighting units 25 there is a spacing 55 which in the present case is twice as great as the minimum spacing between two adjacent positions for the passenger seats 20. The control unit and the other elements of the system according to the invention have been omitted in the views in FIG. 6*a* and the subsequent views, for the sake of greater clarity.

FIG. 6*b* shows a second cabin configuration in which the spacing between two adjacent seats has been increased to the spacing 75'. The lighting elements 25 associated with a respective position of the installation element are marked by arrows in FIG. 6*b*, just as in FIG. 6*a*. As a departure from the arrangement shown in FIG. 6*a*, the spacing of the individual lighting units 25 corresponds to the distance by which the passenger seats 20 can be minimally displaced.

In addition FIG. 6*b* diagrammatically shows a servicing unit which is arranged on the seat 20 and which is adapted to communicate by means of radio transmission with a control unit (not shown) of the system according to the invention.

Figure 7A:
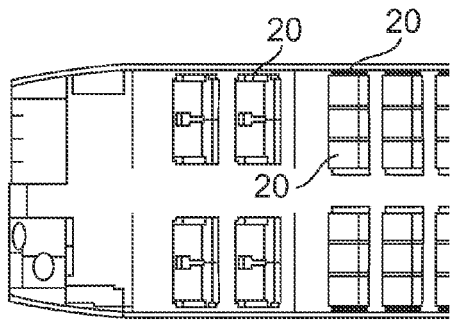
FIGS. 7a and 7b illustrate plan views of two different cabin configurations involving different positions or spacings of the passenger seats in a passenger aircraft cabin.
Figure 7B:
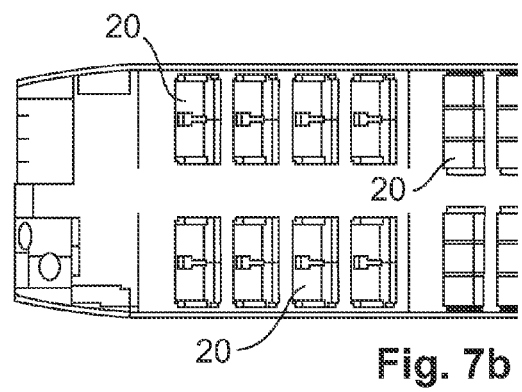

FIGS. 7*a* and 7*b* show plan views illustrating two different cabin configurations with different positions or spacings of the passenger seats in a passenger aircraft cabin.

Typically, different kinds of passenger seats are also used upon reconfiguration of a passenger cabin in a passenger aircraft. The view in FIG. 7*a* involves two rows of higher-class passenger seats, with a total of four seats being provided in one row while six seat positions are provided in mutually juxtaposed relationship in the lower-class areas. The cabin configuration shown in FIG. 7*b* differs from that shown in FIG. 7*a* in that, instead of the two rows in FIG. 7*a*, here there are four rows of the higher-class seats.

Figure 8A:
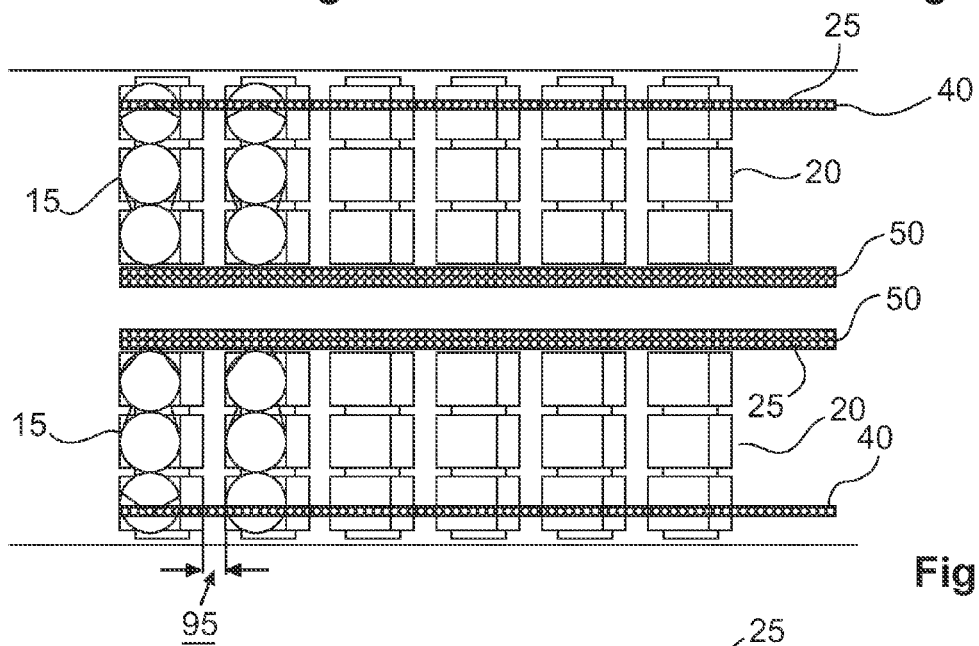
FIGS. 8a and 8b illustrate plan views of the cabin configuration of FIGS. 6a and 6b, FIGS. 9a and 9b illustrate a concept of ascertaining the position of an aircraft passenger seat by means of presence sensors.
Figure 8B:
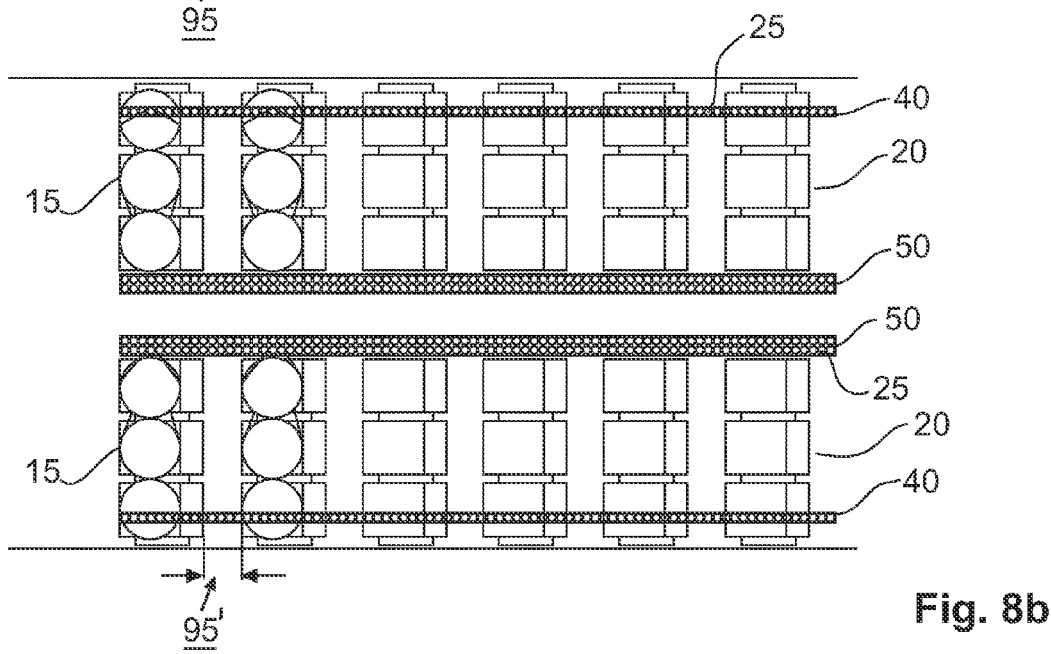

FIGS. 8*a* and 8*b* show plan views illustrating the cabin configurations of FIGS. 6*a* and 6*b*.

The views in FIGS. 8*a* and 8*b* respectively show six rows each with six seat places 20, with each of which there is associated a dedicated lighting position 15. In the present case the lighting positions 15 are shown only for the first two rows of seats as illustration purposes, for the sake of clarity. In addition there are once again two single rails 40 and two double rails 50 with a corresponding plurality of lighting units 25, wherein, on the basis of the respective position information, appropriate lighting units 25 out of the plurality of lighting units 25 are actuated to illuminate the desired lighting positions 15 of the seats 20. The difference between the seat configurations shown in FIGS. 8*a* and 8*b* substantially lies in the spacing between the spacing of a preceding seat and the beginning of a seat arranged therebehind, that is to say the amount of free space between the seats 20. In FIG. 8*a* that spacing is identified by reference 95 while the greater spacing in FIG. 8*b* is identified by reference 95'.

Figures 9A, 9B:
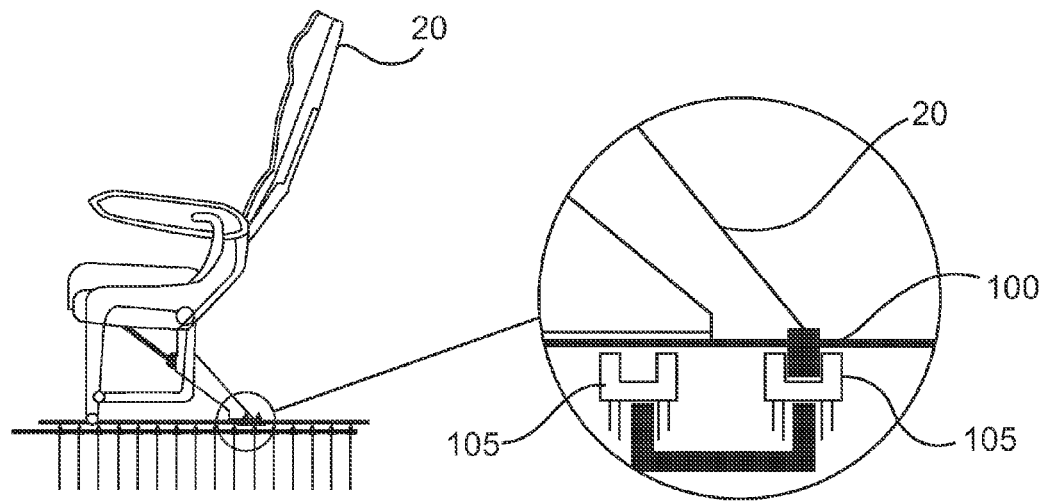

FIGS. 9*a* and 9*b* show a concept of ascertaining the position of an aircraft passenger seat by means of presence sensors.

FIG. 9*a* shows a passenger seat 20 anchored in a floor region, FIG. 9*b* showing a portion thereof on an enlarged scale. The passenger seat 20 in FIG. 9*a* is provided with a projection 100 which upon positioning of the seat engages into a light barrier unit 105 and there interrupts a light beam so that the presence of the projection is detected at that light barrier unit 105. Provided for each possible seat position which is indicated by arrows in FIG. 9*a* is a corresponding light barrier unit 105 so that the presence of a seat 20 can be determined at that position. With such a design configuration, suitable adaptation is to be implemented with the provision of the presence sensors, for example the light barrier units 105, in the floor of the aircraft cabin. In particular care is to be taken to ensure that the signal of the light barrier unit 105, which indicates the presence of a seat at the corresponding position, is suitably passed on. Typically such signal transmission could be achieved by means of cabling in the floor of the cabin. Instead of the light barrier unit 105 it is also possible to use other kinds of presence sensors, for example suitable microswitches. If the presence of a seat 20 is detected at the corresponding position by means of the presence sensors, it is only still necessary to ensure that the correct one of the given positions is also actuated in terms of control for that seat. An example of such an association can involve suitable servicing units being linked in a predetermined sequence to the seats.

Figures 10A, 10B:
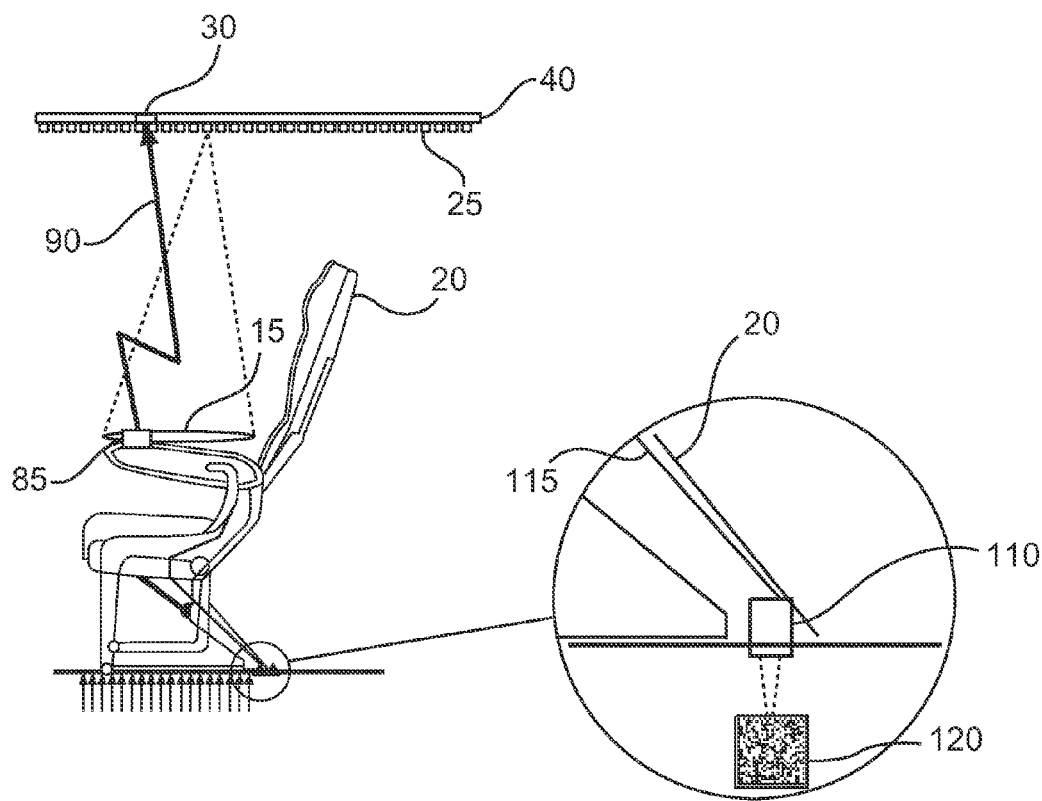
FIGS. 10a and 10b illustrate a concept for ascertaining the position of an aircraft passenger seat by reading out a position mark.

FIGS. 10*a* and 10*b* illustrate a concept of ascertaining the position of an aircraft passenger seat by reading out a position mark.

FIG. 10*a* again shows a seat whose lighting position 15 is illuminated with the system according to the invention. In the present case the arrangement has a single rail 40 with a plurality of lighting units 25, together with a control unit 30. The seat 20 is fitted with an operating or servicing unit 85 adapted for radio transmission to the control unit 30. In addition the servicing unit 85 is coupled to a reading unit 110, in the present case by way of an electrical connection 115 between the reading unit 110 and the servicing unit 85. Disposed in the floor region which, as shown by the arrows in FIG. 10*a*, is equipped for a plurality of discrete positions for the seat 20, is a position mark 120 in the form of a two-dimensional bar code.

The reading unit 110 reads off the position mark 120 and communicates the positional indication encoded therein to the servicing unit 85. The servicing unit 85 in turn, upon operation by the user, communicates a corresponding item of control information together with the positional indication to the control unit 30 which in turn on the basis of that indication selects and actuates a suitable lighting unit 25 so that the lighting region 15 of the passenger seat is illuminated in response to actuation by the user (or is in fact no longer illuminated if the user implements a switch-off command). Alternatively or supplemental to the position mark in the form of a bar code, it is for example also possible to use an RFID position mark which presupposes a suitably adapted reading unit.

An advantage of the concept illustrated in FIGS. 10*a* and 10*b*, in comparison with the concept of FIGS. 9*a* and 9*b*, is that conversion or construction of the floor configuration with the concept shown in FIGS. 10*a* and 10*b* can be effected solely by passive elements so that for example there is no need for additional cabling in the floor region. In this respect the respective possible positions of the seats only have to be provided with the position marks.

Figure 11A:
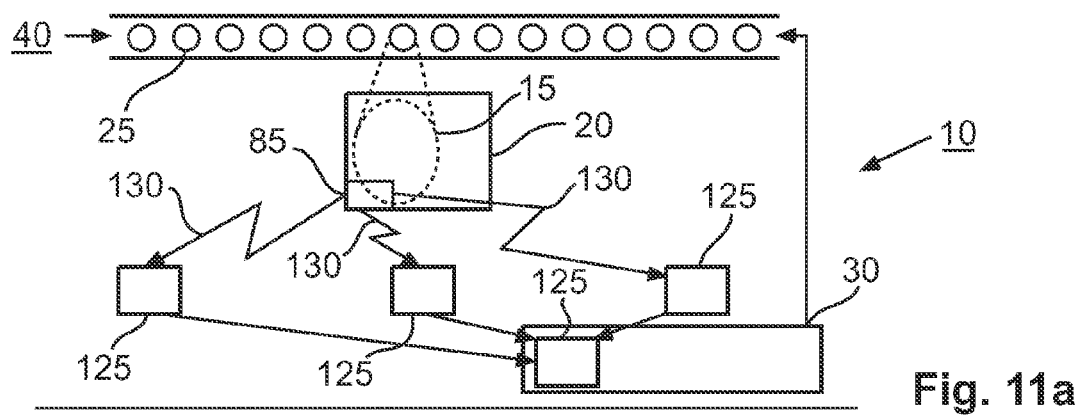
FIGS. 11a and 11b illustrate concepts of ascertaining the position of an aircraft passenger seat by emission of a non-directional or directional locating signal respectively.
Figure 11B:
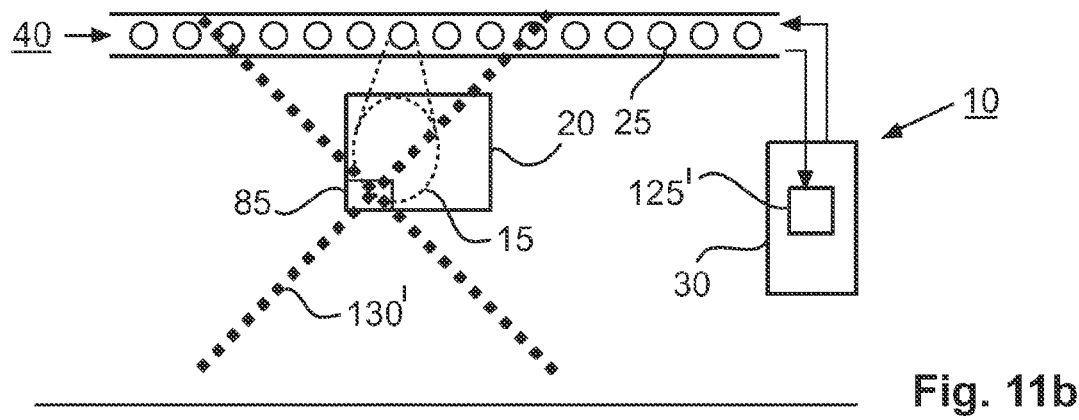

FIGS. 11*a* and 11*b* illustrate concepts in regard to ascertaining the position of an aircraft passenger seat, with the emission of a non-directional or directional locating signal.

The system 10 according to the invention illustrated in FIG. 11*a* includes a plurality of lighting units in a single rail 40, a control unit 30 with a locating unit 125 provided with a plurality of locating sensors 125. In addition a servicing unit 85 is linked to a passenger seat 20 which has a lighting position 15 to be illuminated.

The servicing unit 85 is adapted to emit a non-directional locating signal 130 which is received by the plurality of locating sensors 125 within the locating unit 125. Respective reception of the non-directional locating signal by the respective locating sensor 125 allows conclusions to be drawn about the spacing of the servicing unit 85 from the respective locating sensor 125 so that it is possible to infer the position of the servicing unit 85 and therewith the seat 20 from the information acquired by the plurality of locating sensors 125. On the basis of the position information acquired in that way the control unit 30 is in a position to select a suitable lighting unit 25 to illuminate the lighting position 15 of the seat 20.

Figure 12:
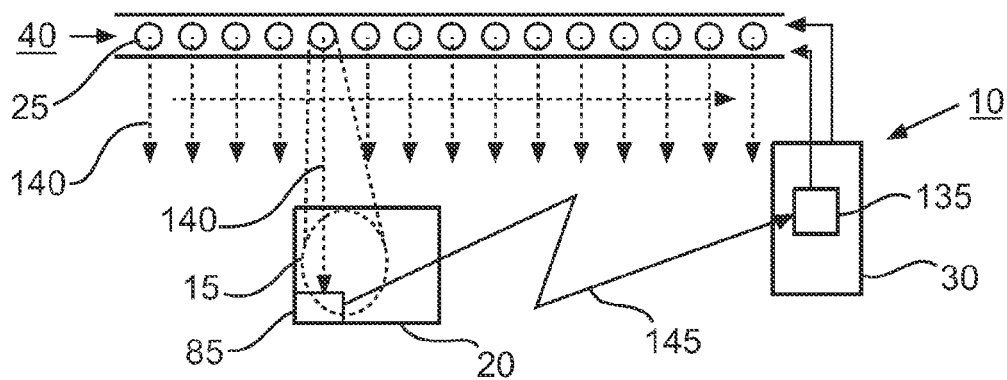
FIG. 12 illustrates a concept of ascertaining the position of an aircraft passenger seat using an enquiry signal and an answer signal, and FIG. 13 diagrammatically illustrates a method according to the invention.

FIGS. 11*a*, 11*b* and 12 each show only a single seat 20 and an individual single rail 40 with a simple plurality of lighting units 25. That serves predominantly for the sake of enhanced clarity and is not to be interpreted as restrictive.

The system 10 according to the invention which is shown in FIG. 11*b* again includes a plurality of lighting units 25 assembled in a single rail 40, a control unit 30 with a locating unit 125' and a servicing unit 85 associated with a seat 20 with a lighting position 15.

The servicing unit 85 is adapted to emit a directional locating signal 130', as indicated by the broken-line X in FIG. 11*b*. The lighting units 125 of the system 10 according to the invention are here in the form of LEDs which at the same time can also be used as sensors. If in the present case lighting units which operate as sensors are struck by the directional locating signal 130' that makes it possible to infer the position of the servicing unit 185 which emitted the directional locating signal 130', having regard to the directional properties and the structure of the directional locating signal 130'. In that way it is also possible to infer the lighting position 15 of the seat 20, that is to be illuminated. The operation of determining the position of the emitting servicing element 85 is effected by the locating unit 125'. On the basis of that information the control unit 30 can once again suitably actuate a selected lighting unit 25 to provide illumination of the lighting position 15.

FIG. 12 illustrates a concept of ascertaining the position of an aircraft passenger seat using an enquiry signal and an answer signal.

The system 10 according to the invention shown in FIG. 12 includes a plurality of lighting units 25 which are combined together in a single rail 40, a control unit 30 with an enquiry unit 35 and a servicing unit 85 adapted to receive an enquiry signal 140 and to emit an answer signal 145. The enquiry unit 135 is in turn adapted to receive the answer signal 145 of the servicing unit. In the FIG. 12 embodiment the enquiry unit 135 provides for actuation of all lighting units 25 in a predetermined time sequence so that a corresponding enquiry signal moves through the cabin as indicated by the dash-dotted arrows. When the enquiry signal 140 reaches the servicing unit 85 the latter sends an answer signal 145 to the enquiry unit 135 in a predetermined time relationship with reception. With evaluation of reception of the answer signal in conjunction with the time sequence of emission of the enquiry signals 140, it is possible to determine the position of the passenger seat 20 with which the servicing unit 85 is associated, so that the lighting position 15 to be illuminated is also known.

Figure 13:
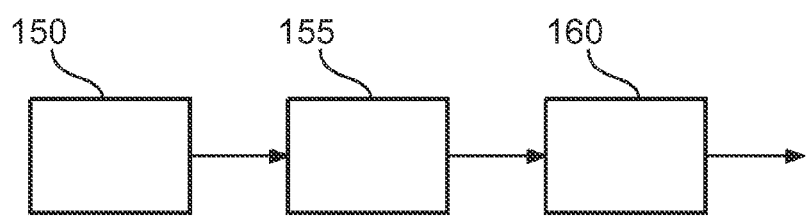

FIG. 13 diagrammatically illustrates a method according to the invention.

In the method according to the invention illustrated in FIG. 13 a step 150 of receiving an item of control information is followed by a step 155 of taking an identification in respect of an installation element from the control information, while in the following step 160 a predetermined service unit is controlled on the basis of the identification out of a plurality of service units, so that a service position is serviced to correspond to the control identification.

In a configuration of the invention more than one light is provided per seat, in which case the lights are used alternatively in matching relationship with the seat position. The lights are arranged at a spacing relative to each other, corresponding to the smallest possible displacement of a seat. The smallest possible displacement is generally one inch. In that case for each seat within a row of seats (mutually juxtaposed seats) there is a dedicated reading light strip whose lights are already mechanically pre-adjusted (for example in a 3+3 arrangement) in the y-direction (transverse direction of the cabin). The optimum x-position (that is to say in the longitudinal direction) of the reading light used for a respective seat is ascertained by a feedback between seat and supply channel, by means of one or more of the following methods: by way of microswitches in the seat rail or at the side lining, by way of an electromagnetic tapping, by way of an optical tapping, by way of a laser-optical tapping or by way of a radio link. By means of suitable circuitry/control, that thus provides for the construction of an adaptive system which is independently capable on the one hand of recognising as a one-off operation the positions of the rows of seats and providing same for further use, and on the other hand selecting the geometrically most appropriate lights and actuating only those for operation. In that respect the optical tappings can be implemented in particular with suitable passive reflectors at defined mounting surfaces on the seat. The use of a radio link can be based on the use of a directional seat-supply channel radio link. In addition, if LEDs are used as lighting means, they can be used as transmitters and receivers: using the physics of LEDs, respectively adjacent LEDs are operated as transmitters and receivers (by polarity reversal). Operation by the user is preferably effected by way of an operating or service unit mounted to or integrated into the seat, by way of switches, in which case the power necessary for sending the control message (encoded radio signal) is obtained from actuation of the switch by way of the piezoelectric principle. In that way the servicing unit can be of an autonomous nature in respect of its power, which is advantageous in particular in short-distance aircraft as here it generally cannot be assumed that the seats involve an electrical connection to the aircraft.

An underlying aspect of the invention is that of recognising the presence of a seat. A further step is then positioning, that is to say determining the sufficiently accurate position of the seat. With a variable seat spacing that is important for using for example a reading lamp, in respect of which the area to be illuminated must be positioned so that the passenger can read. The invention is not limited just to reading lights as service units, but also concerns other aspects such as for example signal symbols, although in regard to the signal symbols positioning which is less accurate in comparison with the situation involving reading lights may suffice. A reading light should always illuminate precisely (or at least not less than) the area which approximately corresponds to the 'folding table'. Signal symbols are installed in the supply channel and a change in position of the seat with respect to the supply channel does not have such a great effect on readability of the signal symbols, as an amended light cone in respect of the reading lamps has an effect on the level of user comfort.

The aspect of the cabling also appears to be of significance for an actual implementation. Cabling in the floor of the cabin is more complicated and expensive than cabling in the seat. In the case of passively determining a position in accordance with a configuration of the invention the information in respect of the positioning of the respective seat, in the case of the control command, is transmitted for example by radio upwardly into the supply channel (PSU, 'passenger service unit'). Disposed in the PSU are electrics, longitudinal cabling, signal symbols and so forth. When retro-fitting existing solutions with aspects of the present invention it is also possible for a receiver to be comparatively easily integrated here. A particularly advantageous configuration of the invention involves an 'autonomous seat': cabling with transmitter and sensor for position recognition is integrated in the autonomous seat. If the required power is acquired for example from a button push by the user, there is no need for a separate power supply. In the region of the seat fixing in the floor of the cabin, it is possible to provide position marks which, in combination with the sensor which reads off the respective position mark, permit position determination by the seat unit itself. Such position marks can be for example optical systems (for example a one- or two-dimensional bar code) or also an RFID chip, being an arrangement which here instead of optically reading the position mark, involves the use of a radio transmission which occurs between the floor and the seat and which is independent of radio transmission of a control signal from a servicing unit to a control unit (for example arranged in the PSU).

The above-described embodiments and configurations are only to be interpreted as examples for describing individual aspects of the invention without being intended to definitively embrace the invention. In particular the invention is not just to be interpreted as being limited to the illustrated embodiments. In addition it will be readily apparent to the man skilled in the art that the individual aspects which are here each described in particular with reference to specific examples can also be combined together independently of the specific examples.

What is claimed is:

1. A system for servicing a plurality of service positions which are assigned to a plurality of installation elements, in particular passenger seats in an aircraft, comprising:
    a plurality of service units, in particular lighting units, wherein the number of service units exceeds the number of service positions to be serviced; and
    a control unit,
    wherein the control unit is adapted to receive a respective item of control information including an identification in respect of an installation element and to control a predetermined service unit on the basis of the identification.

2. The system as set forth in claim 1 wherein the identification includes an indication of a position of the installation element and wherein the control unit is provided with a predetermined association between the position and at least one service unit.

3. The system as set forth in claim 2 wherein the identification includes the indication of an absolute or relative position of the installation element and the control unit is adapted to derive from the absolute or relative position an association with the at least one service unit.

4. The system as set forth in claim 3 comprising a servicing unit linked to the installation element, wherein the servicing unit is adapted to receive signals, in particular radio signals, for determining the absolute or relative position of the installation element and to communicate the control information including the identification on the basis of the determined position to the control unit.

5. The system as set forth in claim 2 wherein the identification includes the indication of an identifier of a position out of a plurality of possible positions of an installation element, wherein at least one service unit is assigned to each identifier.

6. The system as set forth in claim 5 comprising a servicing unit linked to the installation element, wherein the servicing unit is adapted to read an identifier of the position of the installation element out of the environment of the installation element.

7. The system as set forth in claim 1 wherein the identification includes the indication of a unique designation of a servicing unit linked to the installation element and wherein the control unit is equipped with a predetermined association between the designation and at least one service unit.

8. The system as set forth in claim 7 further comprising:
a plurality of presence sensors, in particular microswitches and/or light barrier units, which are respectively adapted to determine a presence of an installation element at an associated position; and
a plurality of servicing units with a respective unique designation,
wherein each installation element out of the plurality of installation elements is linked to at least one servicing unit,
wherein the plurality of positions associated with the presence sensors has a predetermined first sequence, and
wherein the plurality of servicing units has a predetermined second sequence,
wherein the predetermined association between the designation and at least one service unit is afforded in accordance with the sequence of the positions with an installation element present.

9. The system as set forth in claim 7 further comprising:
a locating unit for locating the installation element by way of the servicing unit,
wherein the servicing unit is adapted to emit a locating signal, and
wherein the locating unit is adapted to receive the locating signal and to locate by means of the locating signal.

10. The system as set forth in claim 7 comprising
an enquiry unit adapted to emit a plurality of enquiry signals which are respectively associated with a predetermined position region and to receive an answer signal from the servicing unit, wherein the servicing unit is adapted to receive an enquiry signal from the plurality of enquiry signals and to emit an answer signal in answer to the reception of the enquiry signal, wherein the answer signal includes the designation of the servicing unit,
wherein the association between the designation and the at least one service unit is determined on the basis of the answer signal.

11. The system as set forth in claim 1 wherein the control unit is adapted to control a predetermined group of service units on the basis of the identification.

12. The system as set forth in claim 1 wherein the control unit is adapted on the basis of the identification, instead of the predetermined service unit or the predetermined group of service units, to control an adjacent service unit or group of service units.

13. The system as set forth in claim 1 wherein the servicing unit is autonomous in terms of power, wherein the servicing unit is in particular adapted to acquire the power necessary for emission of an item of control information from a service action by a user, for example by way of a piezoelectric unit which is adapted to obtain power from a button press by the user.

14. A method of servicing a plurality of service positions which are assigned to a plurality of installation elements, in particular passenger seats in an aircraft, in particular with a system as set forth in claim 1, comprising the steps:
receiving an item of control information;
taking an identification in respect of an installation element from the control information; and
controlling a predetermined service unit, in particular a lighting unit, on the basis of the identification from a plurality of service units, wherein the number of service units exceeds the number of service positions to be serviced.

15. A non-transitory computer program product for use on a computer system comprising computer code adapted to cause said computer system to carry out the steps of a method as set forth in claim 14 when the computer code is executed on the computer system.

16. A system for servicing a plurality of service positions within a passenger aircraft comprising:
a rail element having a first plurality of lighting units, the first plurality of lighting units being arranged in a row along a length of the rail element;
a plurality of passenger seats arranged within the passenger aircraft, the rail element being located above the plurality of passenger seats, the first plurality of lighting units outnumbering the plurality of passenger seats, each of the plurality of passenger seats also having a servicing unit, the servicing unit transmitting control information when activated by a user, the control information including position information regarding the position of the passenger seat associated with the servicing unit; and
a control unit configured to receive control information from the servicing units, the control unit illuminating one or more of the lighting units based upon the received control information and position information.

17. The system according to claim 16, wherein the rail element is a single rail element.

18. The system according to claim 16, wherein the rail element is a double rail element.

19. The system according to claim 16 further comprising:
a double rail element having a second plurality of lighting units and located above the plurality of passenger seats, the second plurality of lighting units being arranged in two rows along a length of the double rail element, the first plurality of lighting units and the second plurality of lighting units outnumbering the plurality of passenger seats.

* * * * *